No. 667,981. Patented Feb. 12, 1901.
R. W. JORRES.
MACHINE FOR TURNING WOODEN BOBBINS.
(Application filed Jan. 19, 1900.)
(No Model.) 5 Sheets—Sheet 2.
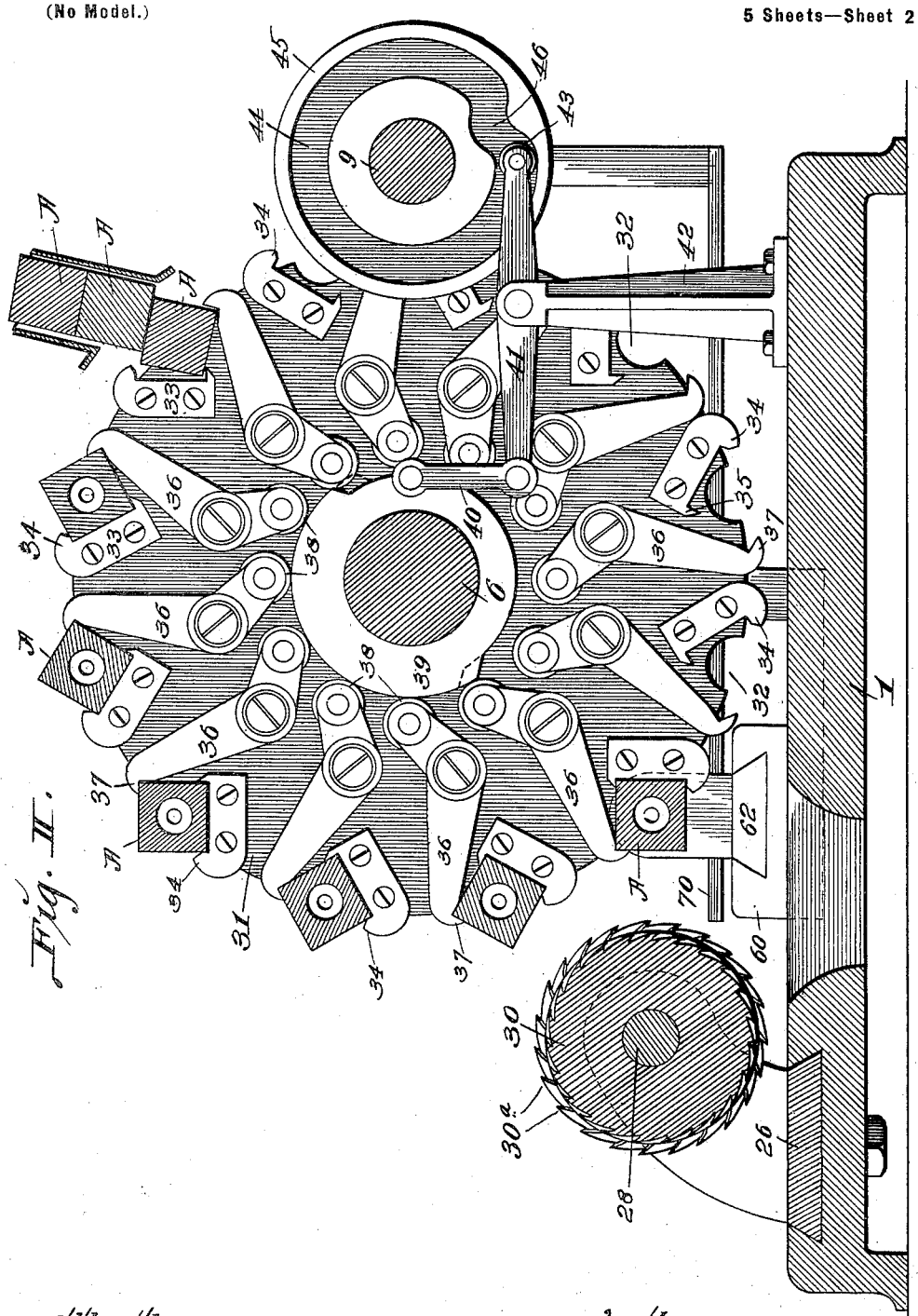

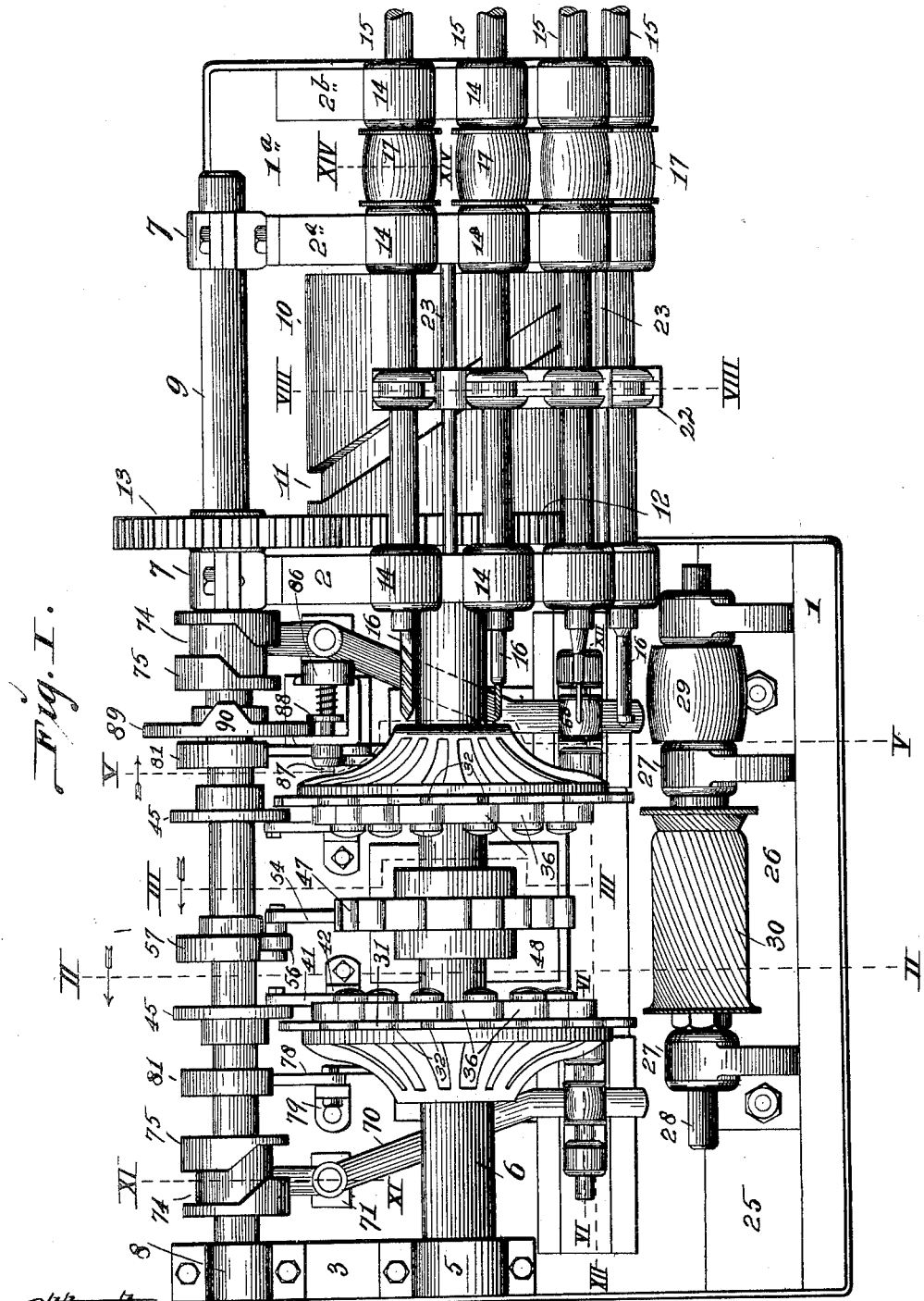

No. 667,981. Patented Feb. 12, 1901.
R. W. JORRES.
MACHINE FOR TURNING WOODEN BOBBINS.
(Application filed Jan. 19, 1900.)
(No Model.) 5 Sheets—Sheet 3.
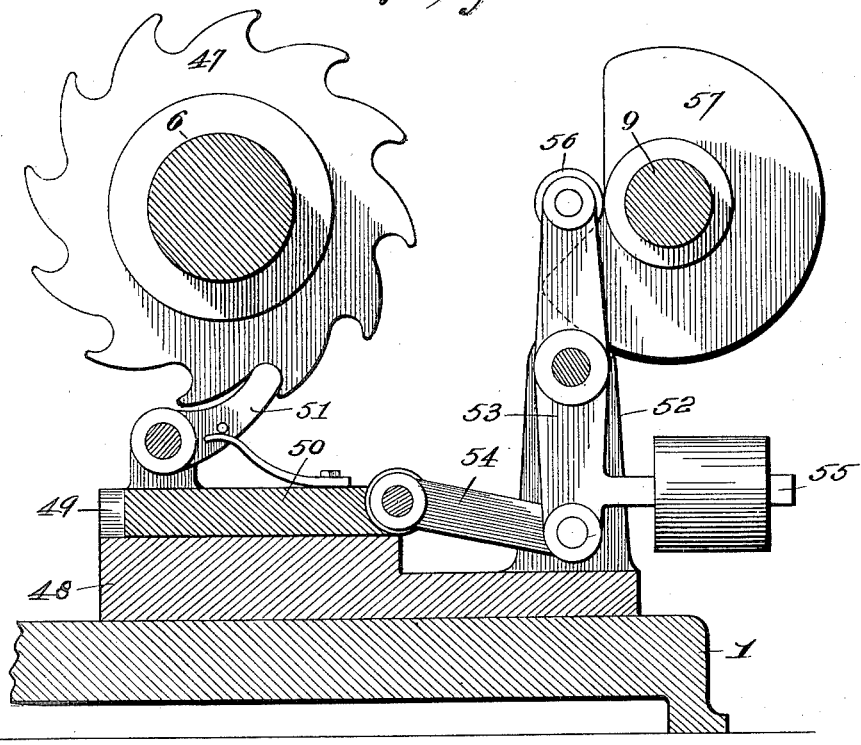
Fig. III.
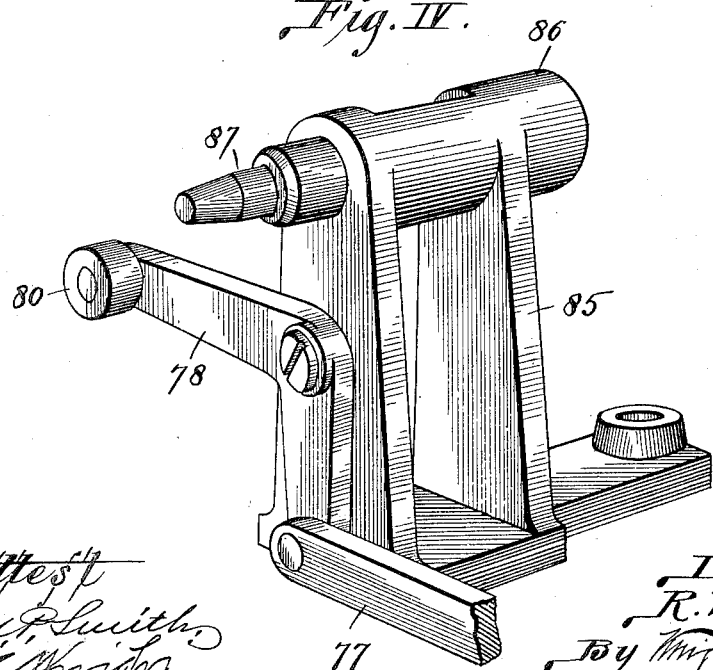
Fig. IV.
Attest:
M. P. Smith
E. S. Knight
Inventor:—
R. W. Jorres:—
By Wright Bro
Atty's.
THE NORRIS PETERS CO., PHOTO-LITHO., WASHINGTON, D. C.

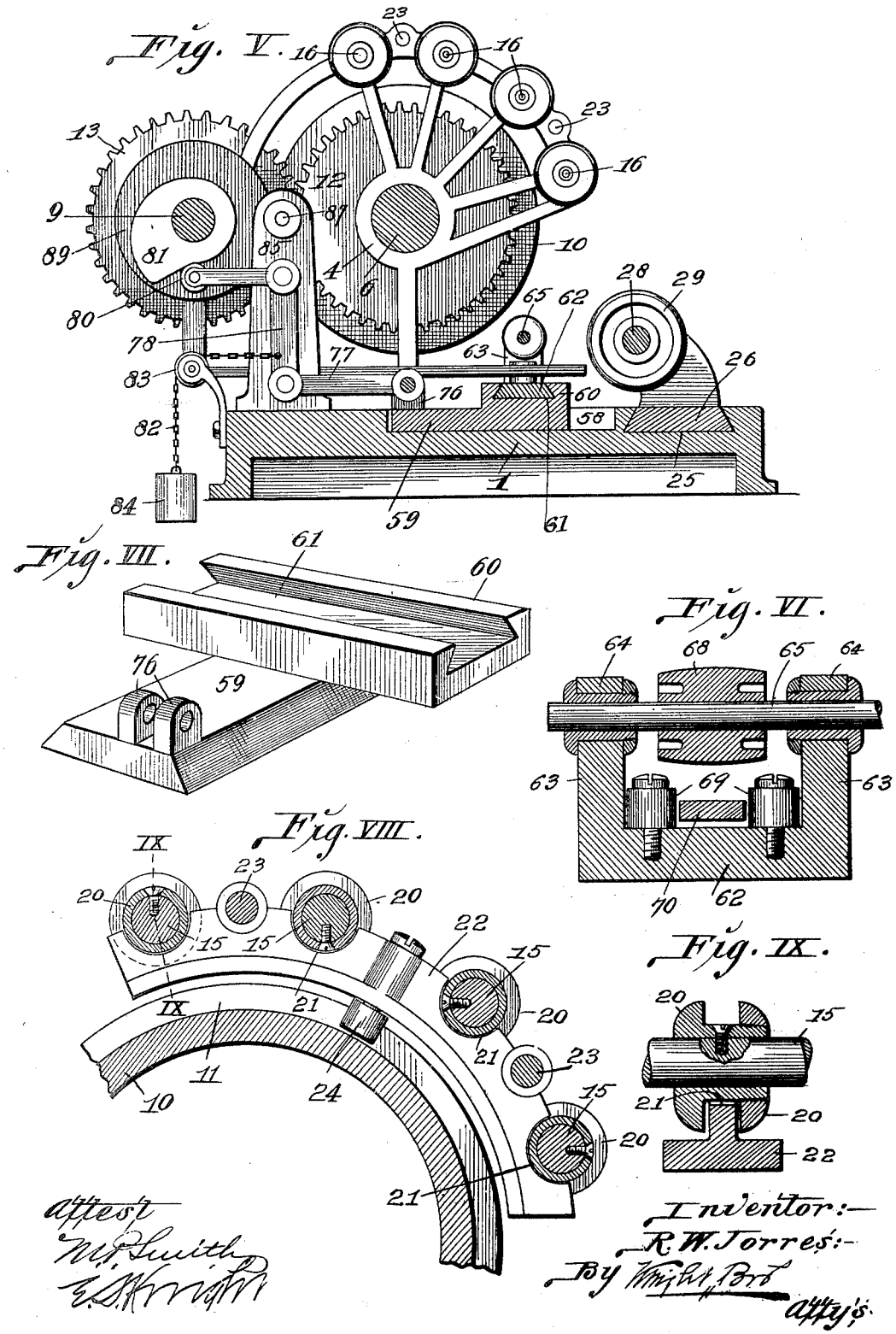

No. 667,981. Patented Feb. 12, 1901.
R. W. JORRES.
MACHINE FOR TURNING WOODEN BOBBINS.
(Application filed Jan. 19, 1900.)
(No Model.) 5 Sheets—Sheet 5.
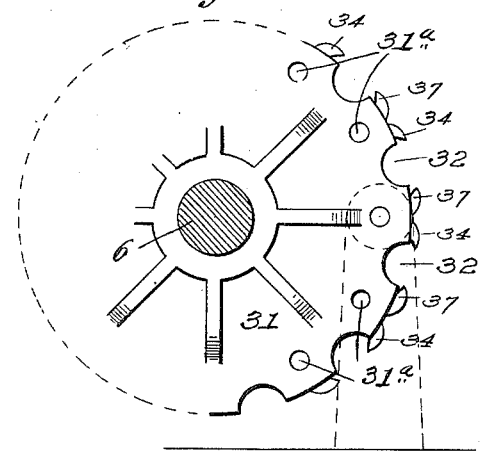
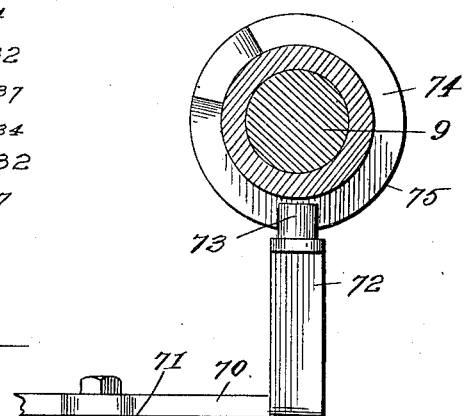
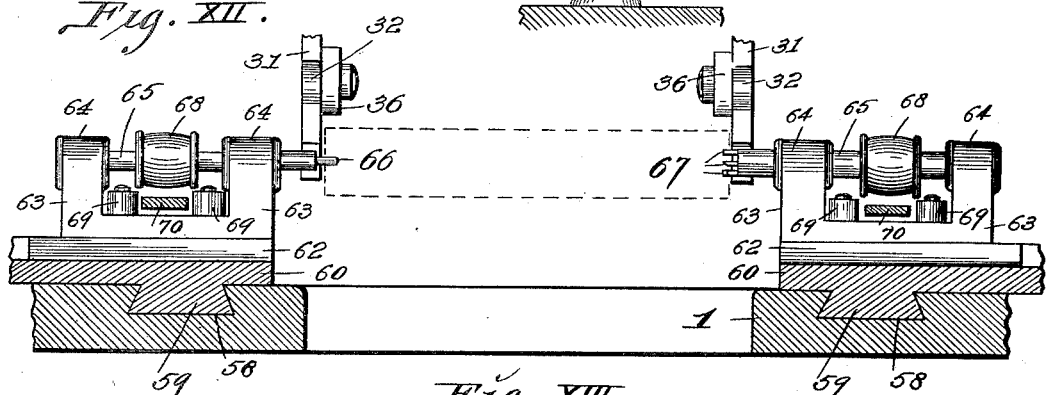
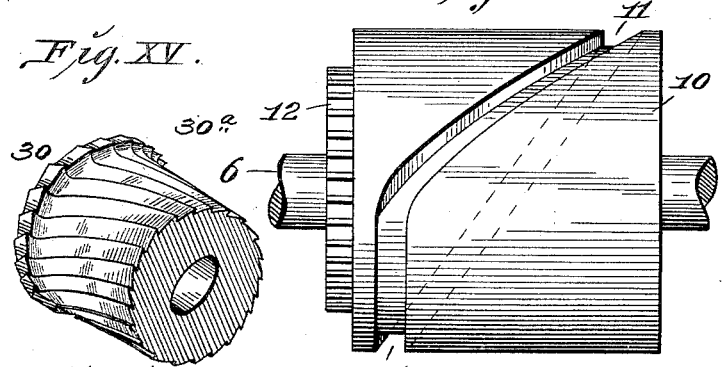
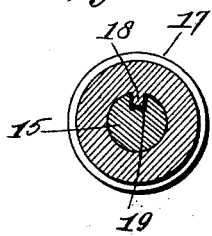
Inventor:—
R. W. Jorres
By Knight Bro
attys.

UNITED STATES PATENT OFFICE.

RALPH WM. JORRES, OF ST. LOUIS, MISSOURI, ASSIGNOR OF THREE-FOURTHS TO ERNEST W. STAMM, INDIVIDUALLY AND AS TRUSTEE, OF SAME PLACE.

MACHINE FOR TURNING WOODEN BOBBINS.

SPECIFICATION forming part of Letters Patent No. 667,981, dated February 12, 1901.

Application filed January 19, 1900. Serial No. 1,985. (No model.)

*To all whom it may concern:*

Be it known that I, RALPH WM. JORRES, a citizen of the United States, residing at the city of St. Louis, in the State of Missouri, have invented certain new and useful Improvements in Machines for Turning Wooden Bobbins and Like Articles, of which the following is a full, clear, and exact description, reference being had to the accompanying drawings, forming part of this specification.

The object of my invention is to construct a simple machine for automatically turning and boring bobbins and spools such as are used in machines for manufacturing textile fabrics.

To the above purpose my invention consists in features of novelty hereinafter fully described, and pointed out in the claims.

Figure I is a plan view of the complete machine. Fig. II is a transverse sectional view taken on line II II, Fig. I. Fig. III is an enlarged transverse sectional view taken approximately on the indicated line III III, Fig. I. Fig. IV is a view in perspective of a standard made use of in carrying out my invention. Fig. V is a transverse sectional view taken approximately on the indicated line V V, Fig. I. Fig. VI is a detail sectional view taken approximately on the indicated line VI VI, Fig. I. Fig. VII is a view in perspective of one of a pair of sliding blocks made use of in my improved machine. Fig. VIII is an enlarged detail sectional view taken approximately on the indicated line VIII VIII, Fig. I. Fig. IX is an enlarged detail sectional view taken approximately on the indicated line IX IX, Fig. VIII. Fig. X is a detail side elevation of a portion of one of a pair of disks made use of in the machine. Fig. XI is an enlarged detail sectional view taken approximately on the indicated line XI XI, Fig. I. Fig. XII is an enlarged sectional view taken approximately on the indicated line XII XII, Fig. I. Fig. XIII is a plan view of a drum used in my machine. Fig. XIV is an enlarged sectional view taken on the line XIV XIV, Fig. I. Fig. XV is an enlarged cross-sectional perspective view of the turning-down cutter-head.

1 indicates a base-plate of rectangular form provided on its right-hand side with an extension $1^a$. Positioned on the right-hand end of the base 1 and upon the extension $1^a$ are the vertically-arranged brackets 2, $2^a$, and $2^b$, and upon the left-hand end of the base is positioned a bracket 3. Rotatably arranged in bearings 4, formed in the centers of the brackets 2 and $2^a$, and in a bearing 5, formed in the bracket 3, is a shaft 6. Arranged in bearings 7, formed on the rear sides of the brackets 2 and $2^a$, and a bearing 8, formed on the rear side of the bracket 3, is a shaft 9, the same being rotated in any suitable manner. Loosely mounted upon the shaft 6, between the brackets 2 and $2^a$, is a drum 10, (see Fig. XIII,) in the periphery of which is formed an irregular groove 11. Integral with the left-hand end of this drum 10 is a gear-wheel 12, which meshes with a gear-wheel 13, fixed upon the shaft 9. By this gearing the rotary motion of the shaft 9 is imparted to the drum 10.

Formed in the upper front portions of the brackets 2, $2^a$, and $2^b$ at equal distances apart are the sets of alined bearings 14, in which are arranged for rotation and for longitudinal movement the shafts 15, the left-hand ends of which carry suitable bits and reaming-out tools 16. Mounted upon the shafts 15, between the brackets 2 and $2^a$, are pulleys 17, which are provided with feathers 18, which engage in grooves 19, formed in the shafts 15. By this arrangement the shafts 15 are rotated while being moved longitudinally. Fixed upon the shafts 15, between the brackets 2 and $2^a$, are the grooved collars 20, (see Figs. VIII and IX,) in which engage semicircular notches 21, formed in a segmental shifting bar 22. This bar 22 slides longitudinally upon guide-rods 23, having their ends seated in the brackets 2 and $2^a$, and rotatably held to the under side of the center of said bar is a roller 24, which rides in the irregular groove 11 in the drum 10. By the means just described the shafts carrying the tools 16 are simultaneously rotated and longitudinally reciprocated.

Formed in the top of the front portion of the base-plate 1 is a longitudinally-extending dovetailed groove 25, in which is arranged for longitudinal adjustment a plate 26, provided with a plurality of upwardly and forwardly extending bracket-bearings 27. Arranged for rotation in these bearings is a shaft 28, on which is fixed a belt-pulley 29 and a cutter head or tool 30, (see Figs. I, II, and XV,) this head or tool engaging and turning the bobbins to the proper size and shape. The cutter-head 30 is integral throughout and is formed into a configuration the reverse of the bobbin to be turned down, whereby when a block of wood is operated upon but a single operation is required to turn the bobbin down to the desired size and configuration. The cutter-head is formed with a series of spirally-arranged teeth 30$^a$, that extend from end to end of the cutter-head, so that in the rotation of the tool a continuous shearing cutting operation is effected upon the bobbin-block, which is thereby turned down uniformly and the bobbin is produced in a clean-cut condition.

Fixed upon the shaft 6 at the proper distance apart and between the brackets 2 and 3 is a pair of disks 31, in the peripheries of which at regular intervals apart are formed semicircular notches 32, the notches of one disk being in horizontal alinement with the notches of the opposite disk. Formed through the right-hand one of these disks 31, at points between the notches in the periphery thereof, are the apertures 31$^a$, which are for the purpose of receiving a locking-bolt, hereinafter described. Upon the inside faces of these disks and to one side of the notches in the peripheries therein are fixed rectangular plates 33, the outer ends of which extend a slight distance beyond the edges of the disks and are there provided with slight engaging lips 34. (See Fig. II.) The opposite or inner ends of these plates are provided with small lugs 35, the distance between said lugs and the engaging lips 34 being equal to one of the sides of the rectangular blocks from which the bobbins are formed.

Pivotally held upon the inside faces of the disks and in radial alinement with the notches therein are the spindle-locking dogs 36, which are really small bell-cranks provided on their outer ends with notched projections 37, which normally occupy positions directly opposite the engaging lips 34 of the plates 33. The inner short arms of these bell-cranks or dogs 36 are provided with antifriction-rollers 38.

Loosely mounted upon the shaft 6, adjacent the inner face of each disk 31, is a cam-ring 39, one half of the periphery thereof being raised or of a greater circumference than the opposite half in order that one-half of the antifriction-rollers 38 carried by the locking-dogs may be engaged to throw said dogs into a locked position during their travel with the disks. Pivotally held to the inner face of each cam-ring 39 is a depending link 40, which is pivotally connected to the forward end of a lever 41, the same being fulcrumed upon a standard 42 and carrying at its rear end an antifriction-roller 43. These rollers 43 operate in the grooves 44 of a pair of oppositely-arranged housed cams 45, fixed upon the shaft 9, the grooves 44 of these cams containing short inwardly-extending curves 46, and the rollers 43 in traversing the grooves will move a short distance upwardly in passing over these inwardly-extending curves 46, which movement in turn imparts a slight rotary motion to the cam-rings 39.

Rigidly fixed upon the shaft 6, between the disks 31, is a ratchet-wheel 47, (see Figs. I and III,) and fixed to the base-plate 1, immediately beneath said ratchet-wheel, is a block 48, in the top of which is formed a dovetailed groove 49. Operating in this groove 49 is a plate 50, the forward end of which carries a spring-actuated pawl 51, the point of which engages the teeth of the ratchet-wheel 47. A standard 52 is formed integral with the rear end of the block 48, and to the upper end of said standard is pivotally held a vertically-arranged lever 53, the lower end thereof being connected to the plate 50 by a link 54. The lower end of the lever 53 is provided with a rearwardly-extending weighted arm 55, and the upper end thereof carries an antifriction-roller 56. Fixed upon the shaft 9, immediately to the rear of the ratchet-wheel 47, is a cam 57, against the periphery of which rides the antifriction-roller 56.

The means for engaging the block from which the bobbin is turned and delivering it to and against the cutter head or tool 30 will now be described. This means is located upon the base-plate 1, immediately to the rear of the dovetailed groove 25, and operates after the bobbin-block has been carried around between the disks and been operated upon by the bits and reaming-out tools. Formed in the base-plate, below the outer portions of the disks 31, are the transversely-extending dovetailed grooves 58, (see Figs. V and XII,) in which are arranged to slide the dovetailed blocks 59, upon the forward ends of which are mounted longitudinally-extending blocks 60, provided with dovetailed grooves 61. Arranged for movement in these grooves 61 are dovetailed blocks 62, from the ends of which extend upwardly the short standards 63, the upper ends thereof being provided with bearings 64. Arranged to rotate in these bearings are the shafts 65, the same being in direct alinement with the path of travel of the peripheries of the disks 31, and projecting from the right-hand end of the left-hand one of the shafts 65 is a pin 66 and projecting from the left-hand end of the right-hand shaft is a plurality of chisel-pointed pins 67. (See Fig. XII.)

Carried by each shaft 65, between the bearings 64, is a belt-pulley 68, (see Figs. I, VI, and XII,) and arranged on top of each block 62, adjacent the standards 63, are antifriction-rollers 69. The forward ends of bars 70 extend between these antifriction-rollers 69, said bars 70 extending rearwardly over the base-plate and being pivoted to lugs 71, formed integral with said plate, adjacent its rear end. These bars 70 terminate immediately beneath the shaft 9, and integral with said bars are the upwardly-projecting arms 72, the same carrying antifriction-rollers 73, which engage in irregular grooves 74, (see Fig. I,) formed in collars 75. These collars are fixed to the shaft 9, one adjacent the bearing 8 and the other adjacent the bearing 7. By the means just described the blocks 62, carrying the shafts 65, the inner ends of which engage the spindle-block, are moved longitudinally in the dovetailed grooves 61 in the blocks 60, and the mechanism for moving said means to and from the cutter-head 30 will now be described.

Integral with the rear end of each of the blocks 59 is a pair of upwardly-projecting ears 76, (see Figs. V and VII,) between which are pivotally held the forward ends of links 77, (shown in detail in Figs. IV, V, and VII,) the rear ends of which are pivotally connected to the lower ends of bell-cranks 78. The left-hand one of these bell-cranks is fulcrumed to a standard 79, which is adjacent the left-hand one of the lugs 71, while the right-hand bell-crank is fulcrumed to a specially-constructed standard hereinafter described. The outer rear ends of the horizontal arms of these bell-cranks 78 carry antifriction-rollers 80, which ride upon the peripheries of cams 81, fixed upon the shaft 9. Secured to the lower ends of the vertical arms of these bell-cranks 78 are chains or cables 82, the same extending rearwardly over suitably-positioned grooved rollers 83 and carrying upon their depending ends weights 84, said weights serving the purpose of bringing the sliding blocks 59 to their rearward positions after having been moved forwardly by the operation of the cams 81.

The means for locking the disks in position while the bits and reaming-out tools are moved longitudinally to engage the bobbin-blocks will now be described.

The specially-formed standard to which the right-hand one of the bell-cranks 78 is fulcrumed (see Fig. IV) comprises a vertically-arranged skeleton frame 85, which is seated upon the base 1, between the shafts 6 and 9 and between the right-hand cam 81 and the grooved collar 75. Formed integral with the upper end of the skeleton frame 85 is a horizontally-arranged bearing 86, in which operates a spring-actuated locking-bolt 87, the same being in direct alinement with and adapted to engage in the apertures 31ª, formed in the outer face of the right-hand one of the disks 31. Fixed upon the locking-bolt 87, within the bearing 86, is a ring 88, against which normally engages the edge of a disk 89, fixed to the shaft 9. A lug 90 is formed integral with and projects laterally from the edge of the disk 89, (see Fig. I,) and when said lug engages against the collar 88 the locking-bolt 87 is moved longitudinally in its bearing 86, consequently withdrawing its point from the aperture 31ª, in which it has been engaged.

The operation of the machine is as follows: The shaft 9 is rotated in any suitable manner, and belts suitably arranged are utilized for driving the pulleys 17, 29, and 68. The pulleys 17 are all driven in the same direction. Consequently the shafts 15, carrying the various tools 16, will be likewise driven in the same direction. As the shaft 9 is rotated the motion thereof is imparted to the drum 10 by means of the gearing 12 and 13. As the drum 10 rotates the roller 24, carried by the bar 22, follows the irregular groove 11 in said drum 10, and said bar 22 is shifted longitudinally, and in turn the shafts 15, carrying the tools 16, are moved longitudinally, and when moved to their left-hand limit of movement the tools 16 will pass through certain of the semicircular notches in the right-hand one of the disks and engage the blocks from which the bobbins are formed, which blocks are held between said disks. These blocks (indicated by the letter A, Fig. II) are fed through a suitably-arranged hopper, the discharge end of which occupies a position immediately above the disks 31 and between the shafts 6 and 9. The ends of these blocks after discharging from the hopper pass into and between a pair of the plates 33 and a pair of the dogs 36, the rollers 38 of this particular pair of dogs being about to engage upon the higher portion of the cam-ring 39, and when the rollers of this pair of dogs pass onto said higher portion of the ring the positions of said dogs are slightly changed, and as a result thereof the block is tightly clamped between the plates 33 and the retaining lips or lugs on the ends of the dogs 36.

The rotary motion for the shaft 6 and disks 31 necessary to carry the blocks A around to the point where they are disengaged and delivered to the cutting-tools is obtained by the ratchet-and-pawl mechanism illustrated in Fig. III and which is located between the disks 31. There are the same number of teeth in the ratchet-wheel 47 as there are semicircular notches 32 in the disks 31, and said ratchet-wheel 47 is moved one notch with each rotation of the shaft 9. The cam 57, carried by the shaft 9, in its rotation engages against the antifriction-roller 56 and moves the same forwardly, thus swinging the lever 53 upon its pivot. In so doing the lower end of said lever is moved rearwardly, and as a result thereof the sliding block 50 is moved rearwardly through the groove 49 in the block 48, and the point of the pawl 51 engaging between the teeth of the ratchet-wheel 47 moves said wheel the distance of one tooth, and when the lever 53 reassumes its normal vertical position, which change of position is accomplished by means of the weighted arm 55, the pawl 51 will be carried forwardly to engage in the next succeeding notch. In this manner an intermittent rotary motion is imparted to the shaft 6 and the disks 31, between which the blocks A are carried.

The cam 57 is so positioned on the shaft 9 relative the drum 10, in which is formed the irregular groove 11, as that the shafts 15, carrying the bits and tools 16, are shifted, so as to engage in the blocks A at the intervals at which the blocks are stationary. To insure the correct positioning of the disks 31 between which the blocks are carried and to lock said disks during the time the bits and tools are brought forward to engage the blocks, the locking-bolt 87 is employed. This bolt 87, operating in its bearing 86, is thrown forward by the action of a coil-spring located upon said bolt within said bearing, and the point of said bolt normally occupies one of the apertures $31^a$, thus locking the disks and shaft 6 against any rotary motion. These disks and shaft are necessarily held locked during the time the bits and tools are brought against the blocks A, and to disengage the point of the locking-bolt 87 from the apertures $31^a$ the disk 89, carrying the lug 90, is arranged upon the shaft 9. As this disk 89 rotates with the shaft 9 the lug 90 is brought into engagement with the ring 88, carried by the bolt 87, and as a result thereof the said locking-bolt 87 is shifted longitudinally, its point being withdrawn from the aperture $31^a$, in which it has been engaged, and during the time said bolt is withdrawn the disks 31 and the shaft 6 are intermittently rotated, as hereinbefore described, and after the lug 90 rides off the ring 88 the coil-spring returns the point of the locking-bolt into the succeeding one of the apertures $31^a$.

The operation of the mechanism for engaging the blocks A after the same have been released from the dogs and from between the disks 31 and carrying said blocks into engagement with the cutting-tools will now be described.

The dovetailed blocks 59 normally occupy positions in the rear portions of the grooves 58, formed in the base 1, and the sliding blocks 62 normally occupy positions in the outer portions of the grooves 61 in the blocks 60. The dogs 36, locking the blocks A between the disks 31, remain in locked position by reason of their antifriction-rollers 38 engaging on the higher portions of the cam-rings 39 until the lowermost one of said blocks occupies a position in horizontal alinement with the center of the cutter-head 30 and between the shafts 65, which, as heretofore stated, are rotatably arranged in bearings carried by the blocks 62. When first brought into this position, this particular block is still held locked by the dogs, and to unlock said dogs and release the block the cam-rings 39 are slightly rotated upon the shaft 6, as shown by dotted lines in Fig. II, by the tilting of the lever 41 as the roller 43 carried thereby passes into the inwardly-extending curve 46 in the groove 44. As said cam-rings 39 are shifted or slightly rotated upon the shaft 6 the antifriction-rollers 38 of the dogs, which locked this particular block in position, pass off from the higher portions of said rings, and the retaining lips or lugs on the end of this pair of dogs move upwardly, thus releasing the block. At the instant preceding the unlocking of this particular pair of dogs the pair of arms or levers 70 are moved upon their fulcrums or pivot-points as the rollers 72, carried by the rear ends of said arms or levers, ride in the irregular grooves 74 in the collars 75, and as a result the forward ends of said arms or levers 70 move toward one another and the dovetailed blocks 62 move in the grooves 61 toward each other and toward the disks 31. At the instant the pair of dogs engaging the ends of this particular block A are unlocked the pin 66 and the chisel-points 67 in the ends of the shafts 65 each have been moved toward one another and engage the ends of the released block, and said block is now ready to be moved forwardly into engagement with the cutting-tool 30. The higher portions of the cams 81 upon the shaft 9 in their rotation engage the antifriction-rollers 80, carried by the horizontal arms of the bell-cranks 78, and depress said ends and in so doing move the lower ends of the vertical arms of said bell-cranks forwardly, in turn sliding the blocks 59 forward in the grooves 58, thus bringing the block A into engagement with the periphery of the cutter-head 30. This cutter-head 30 is rotated at a high rate of speed by means of a belt operated upon the pulley 29, and the block carried between the ends of the shafts 65 is rotated by belting upon the pulleys 68, carried by the shafts 65. As the block is brought into engagement with the cutter-head 30 it is speedily turned to the desired form, after which the blocks 59 pass to their rear limit of movement as the highest portions of the cams 81 pass off from the rollers 80 and the weights 84 cause the bell-cranks 78 to assume their normal positions. During the return of the blocks 59 to their normal positions the arms or levers 70 are so actuated by the movement of the rollers 73 in the grooves 74 of the collars 75 as that the forward ends of said arms move apart or away from one another, thus separating the blocks 62 and disengaging the ends of the shafts 65 from the ends of the block, which has now been turned into the bobbin or spool of the desired shape, and said bobbin or spool on being released drops through an opening formed in the base-plate immediately to the rear of the cutter-head 30. These operations are repeated as the blocks are brought around by the intermittent rotation of the disks 31, and the bobbins or spools of the desired shape are rapidly formed from said blocks. The different tools 16, carried by the shafts 15, bore and ream out the interior of the bobbins in the desired manner, so that when a bobbin passes through the opening in the base-plate it is in a finished condition.

The machine as herein illustrated and described is designed for use in the production of bobbins or spools of simple design, in the making of which only few operations are necessary. It is obvious, however, that where it is desired to make bobbins or spools requiring a greater number of operations the tools 15 and 16 may be supplied at the left-hand end of the machine in like manner to that shown at the right-hand end and described.

I claim as my invention—

1. In a machine of the character described, the combination of means for carrying the blocks to be operated upon in a circular path, a revoluble drum containing a cam-groove and mounted concentrically with the center of movement of the block-carrying means, a segmental shifting bar, means for engagement between said shifting bar and said cam-groove, and tool-shafts having engagement with said shifting bar adapted to be moved thereby, substantially as described.

2. In a machine of the character described, the combination of means for carrying the blocks to be operated upon in a circular path, a revoluble drum containing a cam-groove and mounted concentrically with the center of movement of the block-carrying means, a segmental shifting bar, a roller carried by said shifting bar adapted to operate in said cam-groove, tool-shafts, and collars carried by said tool-shafts arranged in engagement with said shifting bar, substantially as described.

3. In a machine of the character described, the combination of block-receiving disks, a shaft on which said disks are mounted, means for intermittently rotating said shaft and disk, block-holding dogs pivoted to said disks, a cam-ring loosely mounted on said disk-carrying shaft and arranged to engage and hold said dogs, and means for rocking said cam-ring to move the dogs and cause them to grip and release the blocks held thereby during the intervals that said disks are at rest, substantially as described.

4. In a machine of the character described, the combination of block-receiving disks, a shaft on which said disks are mounted, means for intermittently rotating said shaft and disks, block-holding dogs pivoted to said disks, a cam-ring loosely mounted on said disk-carrying shaft and adapted to engage and hold said dog, a lever having connection with said cam-ring, and a cam for tripping said lever whereby said cam-ring is rocked with relation to said dogs for the purpose of engaging and releasing the dogs to cause them to grip and release the blocks carried thereby during the intervals that said disks are at rest, substantially as described.

5. In a machine of the character described, the combination with a cutter-head, of means for holding the blocks to be turned, said means comprising the sliding blocks 60, the sliding blocks 62 mounted on said blocks 60, said sliding blocks 62 being arranged for movement transversely to said blocks 60, the revoluble shafts 65 mounted in the sliding blocks 62, and means for reciprocating said blocks 62, substantially as and for the purpose set forth.

6. In a machine of the character described, the combination with a cutter-head, of means for holding and turning the blocks to be turned, said means comprising the sliding blocks 62, the revoluble shafts 65 mounted in said sliding blocks, the pivoted bars 70 arranged to engage said sliding blocks, the sliding blocks 59, 60, in which said sliding blocks 62 are mounted, the bell-crank 78 connected to said sliding blocks 59, 60, means for moving said bell-crank, and the weight 84 arranged to retract said bell-crank, substantially as described.

RALPH WM. JORRES.

In presence of—
 E. S. KNIGHT,
 M. P. SMITH.